United States Patent Office 3,086,990
Patented Apr. 23, 1963

3,086,990
HALOGENATED α-METHOXYPHENYL
ACETIC ACIDS
Edward Wilkins Reeve, College Park, Md., assignor to Fundamental Research, Inc., a corporation of Delaware
No Drawing. Filed July 10, 1959, Ser. No. 826,138
6 Claims. (Cl. 260—521)

This invention relates to new compositions of matter and, more particularly, to plant growth regulators.

In the agricultural and related fields, many compounds are known to have physiological activity in plants, being plant growth stimulants, weed-killers and the like. In my copending applications Serial No. 599,671, filed on July 16, 1956, and in Serial No. 679,108, now Patent No. 3,038,002, filed on August 19, 1957, there are disclosed methods for preparing a class of compounds which have physiological activity as plant growth regulators. This present application of mine is a continuation of these applications. The most outstanding plant growth regulator disclosed in the said copending applications is 3,4-dichloro-alpha-methoxyphenylacetic acid. This compound, while it is decidedly biologically active, does not translocate through the roots of plants. Such translocation is highly desirable in order to obtain deep penetration of the regulator and transfer of it to the soil and hence to untreated plants as, for example, weeds that were missed in the spraying of the regulator but which were to be killed. Compounds which translocate through the roots and which are plant growth regulators are commercially desired, being of considerable interest to the agricultural and related industries.

An object of this invention is the provision of new compositions of matter which are plant growth regulators. A further objective is the provision of such regulators which translocate through the roots of the plants being treated. A still further object is providing plant growth regulators which translocate through the roots and are in the form of or are readily converted into simple, soluble salts. These and other objectives will appear hereinafter.

As disclosed in the said copending applications compounds of the type

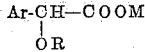

can be prepared by treating aryl aldehydes with a haloform in the presence of a base and an ether-forming component. In the type formula Ar represents an aryl group such as a phenyl ($C_6H_5$), and M represents a metal from such compounds as sodium or potassium hydroxide or a nitrogen containing radical from a salt-forming material such as ammonia or an amine or M is a hydrogen atom or a carbon-containing alkyl group and R represents a methyl or an ethyl group. Also, as disclosed, the Ar group or phenyl group may bear halogen groups. While it had been noted that increased activity over and above that of the alpha-methoxyphenylacetic acid was obtained by placing two chlorine atoms in the phenyl group in the 2,4- or 3,4-positions, the resultant dichloro derivatives did not translocate through the roots as did the parent. Thus, while increased activity was obtained, the desirable translocating power was lost.

By this present invention, it has been found that certain compounds have plant growth regulating activity increased above the parent by 10 times or more and yet retain the translocating power of the parent. These compounds are m-chloro-alpha-methoxyphenylacetic acid and its derivatives; m-fluoro-alpha-methoxyphenylacetic acid and its derivatives and para-fluoro-alpha-methoxyphenylacetic acid and its derivatives. The parent acids are very effective and the derivatives which may be used include the acids, esters and amides, among others. The salts that are used are usually such salts as the sodium or potassium salts or amine salts derived from such amines as methyl amine, dimethylamine, ethanolamine, diethanolamine, triethanolamine and similar salts including the ammonium salts. The amides are the simple amides and those made from the above amines. The esters are usually the lower esters such as the methyl and ethyl esters. As noted above, the corresponding halogen substituted alpha-ethoxyphenylacetic acids may also be used. The acids and their derivatives may be applied directly to the plants and/or to the ground. The preparation and use of the compounds of this invention can be seen by the description and the examples appearing below. These are given for illustrative purposes and are not limitative.

EXAMPLE I

*Ammonium m-Chloro-Alpha-Methoxyphenylacetate*

In a 500-ml. three-necked flask equipped with a mechanical stirrer, dropping funnel, and thermometer were placed 15 g. (0.107 mole) of m-chlorobenzaldehyde and 36 g. (0.143 mole) of bromoform. A solution containing 33 g. (0.572 mole) of potassium hydroxide dissolved in 150 ml. of commercial methanol was added over a period of three hours. The reaction temperature was regulated between 0–5° C. by means of an ice-salt bath. After completion of the addition, the solution was allowed to stand overnight. The solution, a white precipitate, presumably potassium bromide, along with 100 ml. of water which was used in several fractions to wash the adhering particles of the precipitate from the reaction flask, and 300 ml. of saturated aqueous sodium chloride were placed in a one liter beaker. The beaker was warmed to complete the dissolution of the precipitate, and the pH adjusted to 3.2 with concentrated hydrochloric acid. Upon cooling the solution to 0° C., a white flocculent precipitate formed which was washed three times with 10 ml. portions of distilled water and twice with 20 ml. portions of acetone. The crystals were then placed in a 600 ml. beaker and stirred with 200 ml. of acetone for one-half hour and filtered. The lustrous, white crystals of sodium hydrogen di-m-chloro-alphamethoxyphenylacetate which were obtained were purified by recrystallization from 50% aqueous ethanol. The yield of the pure sodium acid salt, melting at 220–221° C., was 18 g. equivalent to 75% of the theoretical yield. The neutralization equivalent of the sodium acid salt was determined to be 422. The theoretical value is 423.

The acid was obtained as an oil by dissolving the sodium acid salt in 1 N sodium hydroxide and pouring this solution into a two-fold excess of 2 N hydrochloric acid. The oil was taken up in ether, washed free of chloride ion, dried, and the ether removed on a steam bath, producing a colorless oil as residue. Attempted recrystallization of the oil from various solvents was unsuccessful.

The ammonium salt was prepared by the addition of excess ammonium hydroxide to the oil and the solution evaporated on top of an oven. The ammonium 3-chloroalpha-methoxyphenylacetate was recrystallized from a 75% ethyl acetate-25% ethanol solution and then melted at 160–163° C.

*Analysis.*—Calculated for $C_9H_{12}O_3NCl$: C, 49.66%; H, 5.56%; N, 6.44%; $OCH_3$, 14.26%. Found: C, 50.11%; H, 5.58%; N, 6.14%; $OCH_3$, 14.44%. Several drops of the concentrated ammonia solution were added to the cooling crystallizing media to make up for any loss of ammonia from the ammonium salt during heating.

The ammonium salt was tested on plants at the Beltsville, Maryland, Plant Industry Station of the U.S.D.A.

and was found to translocate through plants including the root systems. It has about ten times the activity of alpha-methoxyphenylacetic acid.

The free acid and the sodium salt are similarly biologically active. Amides, such as the simple amide, may also be used.

EXAMPLE II

Ammonium m-Fluoro-Alpha-Methoxyphenylacetate

A solution consisting of 10 g. (.08 mole) of m-fluorobenzaldehyde, 25 g. (0.1 mole) of bromoform and 50 ml. of commercial methanol was placed in a 250-ml. three-necked flask equipped with a mechanical stirrer. The flask was surrounded by an ice and salt bath to bring the temperature to 0° C. A previously prepared solution of 25 g. (0.44 mole) of potassium hydroxide dissolved in 100 ml. of commercial methanol was added dropwise, over a period of 1 to 1½ hours, to the mixture in the flask while the temperature was maintained in the range of 0–5° C. Following this addition, the reaction mixture was maintained at a temperature of 0° C. for a total time of three hours, after which the solution was allowed to warm to room temperature on standing overnight. The solution was placed in an 800 ml. beaker and 300 ml. of one-half saturated sodium chloride solution was added. The sodium chloride solution was utilized to wash the reaction flask free of most of the adhering reaction mixture. The mixture was warmed to 50° C. to bring about complete dissolution of all components. It was then cooled to 25° C. and the pH adjusted to 3.13. A precipitate was observed which became more voluminous when the temperature was brought to 0° C. by means of an ice-salt bath. This precipitate was filtered off, washed twice by stirring with 100 ml. portions of acetone, and dried. The weight of the sodium hydrogen di-m-fluoro-alpha-methoxyphenylacetate was 8.7 g. equivalent to 59% of the theoretical amount. This material after being recrystallized twice from 50% aqueous ethanol and dried had a melting point of 209–211° C. and a neutralization equivalent of 392. The theoretical neutralization equivalent is 390.

Preparation of the ammonium salt was accomplished by dissolving 3 g. of the sodium acid salt in 25 ml. of water, acidifying, and extracting with three 15 ml. portions of ether. The combined ether extract was washed free of chloride ion with four 15 ml. portions of water, dried, and the ether removed on a hot plate, whereupon an oily residue remained which could not be made to crystallize from a variety of solvents. To the oil was added 5 ml. of 8.4 N ammonium hydroxide and the solution was evaporated on top of an oven. The crude ammonium m-fluoro-alpha-methoxyphenylacetate was recrystallized three times from 2:1 ethyl acetate-ethanol solution. Several drops of the concentrated ammonia solution were added to the cooling crystallizing media to make up for any loss of ammonia from the ammonium salt during heating. The white amorphous crystals obtained weighed 1.2 g. and had a melting range of 153–155° C.

*Analysis.*—Calculated for $C_9H_{12}O_3NF$: C, 53.72%; H, 6.01%; N, 6.96%; $OCH_3$, 15.43%. Found. C, 54.04%; H, 5.82%; N, 6.97%; $OCH_3$, 15.64%.

The ammonium salt had plant growth regulatory properties comparable in kind and amount to the m-chloro derivative described in Example I.

The methyl ester of m-fluoro-alpha-methoxyphenylacetic acid is similarly active.

EXAMPLE III p-Fluoro-Alpha-Methoxyphenylacetic Acid

A solution containing 10 g. (0.08 mole) of p-fluorobenzaldehyde, 25 g. (0.1 mole) of bromoform and 50 ml. of commercial methanol was placed in a 250-ml. three-necked flask equipped with a mechanical stirrer, thermometer and a dropping funnel. The contents of the flask were cooled to 0° C. with an ice-salt bath. Twenty-five grams (0.44 mole) of potassium hydroxide dissolved in 100 ml. of commercial methanol was added slowly, so that the temperature was maintained between 0–5° C. This addition required about one hour. After the addition, the stirring was continued overnight; the temperature of the bath rose to room temperature during this interval. The mixture was then placed in an 800 ml. beaker, the flask washed free of adhering substances by means of two 50-ml. portions of water and these washes, along with 150 ml. of saturated sodium chloride solution, were combined in the beaker with the reaction mixture. The mixture was made homogeneous by warming to 50° C. After cooling, the mixture, which had a pH of 11, was extracted twice with 50 ml. portions of ether. The ether was discarded and the basic aqueous solution was warmed to 70° C. to remove the last vestiges of ether. The solution was then cooled in an ice bath at 25° C. and the pH brought to 3.15 by the addition of concentrated hydrochloric acid whereupon the sodium hydrogen di-p-fluoro-α-methoxyphenylacetate precipitated as voluminous white crystals. The solution was cooled to 0° C. in an ice bath, filtered, and stirred twice for thirty minute intervals each with 100 ml. portions of acetone. The yield of the sodium acid salt was 10.2 g. equivalent to 69% of the theoretical amount. The sodium acid salt was recrystallized twice from 50% aqueous ethanol, yielding a material which had a melting point of 235–237° C. and a neutralization equivalent of 388. The theoretical neutralization equivalent is 390.

Preparation of p-fluoro-α-methoxyphenylacetic acid was accomplished by dissolving the sodium acid salt in distilled water, acidifying and extracting with ether. The ether solution was washed with distilled water four times, dried, and the ether removed on a hot plate. The oil which remained was crystallized from a 3:1 60–80° C. ligroin-chloroform solution. Care was taken so that cooling of the solution occurred slowly until the temperature was —20° C., for the acid tended to precipitate as a oil. Final cooling was accomplished in a —20° C. cold room. The melting point of the pure dry p-fluoro-α-methoxyphenylacetic acid was 54–56° C. The neutralization equivalent was found to be 184. The theoretical value is 184.

*Analysis.*—Calculated for $C_9H_9O_3F$: C, 58.70%; H, 4.93%; $OCH_3$, 16.85%. Found: C. 58.89%; H, 4.70%; $OCH_3$, 16.70%.

The free acid was tested as described in Example I and was found to translocate through the roots and to have many times the physiological activity of alpha-methoxyphenylacetic acid.

A diethanolamine salt of the free acid gives similar plant growth regulation as does the potassium salt.

From the above examples it is readily noted that highly active compounds are very readily produced by my direct process without the isolation of aryltrihalomethylcarbinol intermediates. The compounds of this invention also form insoluble sodium acid salts and are therefore useful both as biological and analytical agents. Sodium hydrogen di-(m-chloro-alpha-methoxyphenylacetate) has about one-quarter the solubility in water of sodium hydrogen di-(alpha-methoxyphenylacetate).

With respect to physiological activity, it has been found surprisingly enough that the corresponding o-chloro-, p-chloro-, and o-fluoro-substituted alpha-methoxyphenylacetic acids do not translocate through the roots of plants. Therefore, these compounds do not have the physiological behavior of the compounds of this invention.

By this invention relatively simple agents that exert outstanding plant growth regulating effect are made available to the agricultural and to other industries. These compounds can be prepared in excellent yields at most reasonable costs. The acids or their derivatives may be used, these derivatives being derived from the carboxylic acid portion of the acids and being derivatives such as salts, esters, amides and the like. The derivatives are readily hydrolyzable or convertible to the acids. The regulants of this invention exude through the plant roots in quantities that are large enough to permit their migration to and being absorbed by other plants. Upon such transition they affect the receiving plant also. As is known, the tracing of these systemic chemicals is effected by using radioactive tracers, chromatography and similar techniques. The regulants of this invention may also be useful as precursors or carriers of chemicals for killing or controlling pests, or for protecting against plant diseases.

While the invention has been disclosed herein in connection with certain embodiments and certain procedural details, it is clear that changes, modifications or equivalents can be used by those skilled in the art; accordingly, such changes within the principles of this invention are intended to be included within the scope of the claims below.

I claim:

1. A compound selected from the group consisting of the following: m-chloro-alpha-methoxyphenylacetic acid, m-fluoro-alpha-methoxyphenylacetic acid, and para-fluoro-alpha-methoxy-phenyl-acetic acid; sodium and potassium salts thereof; the sodium acid salts thereof and the salts thereof with ammonia, methyl amine, dimethylamine, ethanolamine, diethanolamine and triethanolamine.

2. m-Chloro-alpha-methoxyphenylacetic acid.
3. m-Fluoro-alpha-methoxyphenylacetic acid.
4. p-Fluoro-alpha-methoxyphenylacetic acid.
5. A compound in accordance with claim 1 which is an ammonium salt.
6. A compound in accordance with claim 1 which is a sodium salt.

References Cited in the file of this patent

Mitchell et al.: "Science," vol. 118, pages 518–519 (1953).

Misra et al.: "Journal Indian Chemical Society," vol. 28, pages 480–482 (1951).

Mel'nikor et al.: "Chemical Abstracts," vol. 48, pages 6398–99 (1954).

Muir et al.: "Chemical Abstracts," vol. 46, page 11149 (1953).